Sept. 27, 1966 R. E. HARPER 3,275,532
METHOD OF RECOVERING WATER FROM SEA WATER
Filed April 9, 1962 3 Sheets-Sheet 1

INVENTOR
Ralph E. Harper

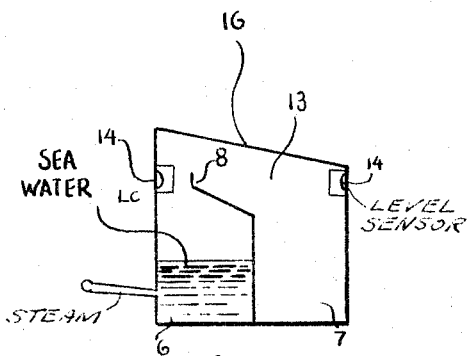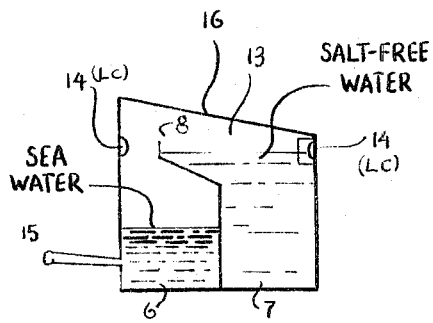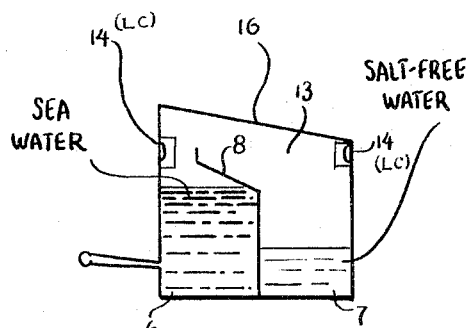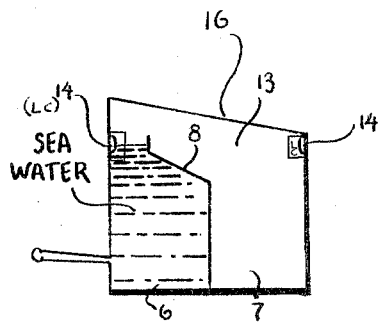

Sept. 27, 1966    R. E. HARPER    3,275,532
METHOD OF RECOVERING WATER FROM SEA WATER
Filed April 9, 1962    3 Sheets-Sheet 3

INVENTOR
Ralph E. Harper

United States Patent Office 3,275,532
Patented Sept. 27, 1966

3,275,532
METHOD OF RECOVERING WATER FROM SEA WATER
Ralph E. Harper, 2564 Ross Road, Silver Spring, Md.
Filed Apr. 9, 1962, Ser. No. 186,208
1 Claim. (Cl. 203—11)

This invention relates to evaporating and condensing a liquid and relates more particularly to an apparatus and a method for evaporating and condensing fresh water from sea water.

Prior methods for recovery of fresh water from sea water have included such processes as distillation, freezing, and electrolysis of sea water solutions in order to obtain a pure product. These methods have not been practical for large volume production of fresh water because complex apparatus is required and costly forms of energy are necessary for the successful separation of fresh water from the sea water solution. For example, the known method of distillation requires the application of considerable energy in the form of heat in order to raise sea water to its boiling point. Fresh water vapor which evaporates from the boiling solution is collected, cooled and condensed in apparatus which is complex and costly. In the usual closed distillation system, a residue of solid constituents from the sea water accumulates in the vapor generating unit, and this requires shut-down of the system periodically for cleaning and maintenance purposes. The initial and operating costs of such a system, as in other known systems, prohibit the use of such methods for production of water in quantities sufficient to supply the needs of densely populated areas or arid regions.

The present invention provides a method and apparatus for the economical production of fresh water from sea water. The method of this invention utilizes relatively small differences in temperature and pressure to obtain fresh water from a sea water source. Economical production is the result of low energy inputs, efficiency of operation, and simplicity of apparatus as compared to existing methods and apparatus.

The method of evaporating and condensing water according to the present invention comprises the steps of evaporating water vapor from sea water into a confined space which is at a certain pressure, establishing an equilibrium between the sea water and the vapor in the confined space, condensing water from the vapor phase by increasing pressure on the confined space, and removing the condensed water. Temperature differentials may be applied to increase the evaporation rate from the sea water and to increase the condensation rate from the vapor phase, but pressure differences and the means of varying pressures within the system are essential for evaporation and condensation according to this invention. A novel means of applying pressure differentials to a closed system is provided by this invention, in that the reduction in pressure during the evaporation cycle and the increase in pressure during the condensation cycle are each obtained by varying the sea water and fresh water levels within the closed system. The apparatus of this invention is designed to provide an efficient heat exchange relationship between the evaporation phase and the condensation phase of the system, and the apparatus provides for a ready flow of sea water through the system in a manner that prevents an accumulation of residue and thus eliminates lost time resulting from the shut-down and cleaning of the water recovery plant.

The invention will be described more fully with reference to the accompanying drawings:

FIGURE 3 is a cross-sectional end view of the apparatus of FIG. 1 at the evaporation cycle of the process.

FIGURE 4 is a cross-sectional end view of the apparatus of FIG. 1 at the condensation cycle of the process.

FIGURE 5 is a cross-sectional end view of the apparatus of FIG. 1 at the beginning of the collection and removal cycle of the process.

FIGURE 6 is a cross-sectional end view of the apparatus of FIG. 1 at the end of the collection cycle of the process.

Figure 1:
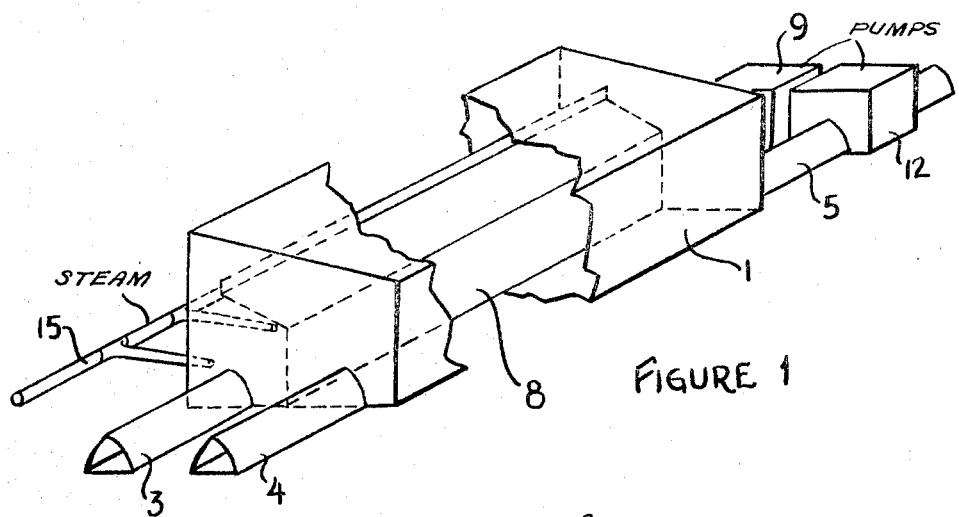
FIGURE 1 is a dimensional view of one embodiment of apparatus which is a part of this invention.
Figure 2:
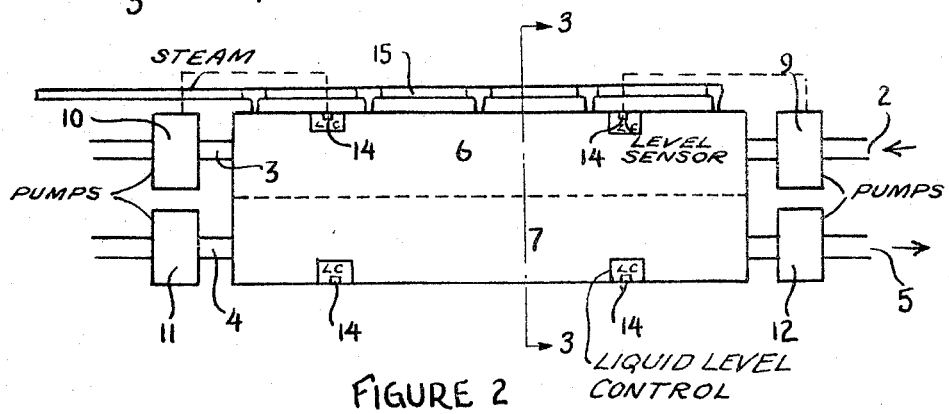
FIGURE 2 is a top view of the same apparatus shown in FIGURE 1.

With reference to the embodiment shown in FIGURES 1 and 2, the recovery unit 1 includes an inlet 2 and an outlet 3 for sea water, and an inlet 4 and outlet 5 for fresh water. Sea water is pumped into the unit 1 by means of a pumping device 9 and sea water is pumped out of the unit by means of a pumping device 10. Fresh water may be pumped into the unit by means of a pumping device 11 and fresh water may be pumped out of the unit by means of a pumping device 12.

As shown in the sectional views of FIGURES 3 through 6, the recovery unit 1 is divided into a sea water channel 6 and a fresh water channel 7 by partition 8. The partition 8 separates the sea water from the fresh water, but provides a confined space 13 in the unit 1 which is common to both channels. The recovery unit is a closed system in that it is sealed from external atmospheric conditions in order to provide for the control of pressure on the confined space 13. Channels 6 and 7 are liquid-sealed from each other to prevent mixing of the liquid carried by channel 6 with the liquid carried by channel 7, but a free exchange of gaseous vapors over channels 6 and 7 is provided by the confined space 13 common to both channels.

In the preferred embodiment of this invention, sea water is pumped by means of a pumping device 9 from a supply source into channel 6 of water recovery unit 1. Sea water is discharged from the recovery unit 1 through outlet 3. The discharge of sea water from the recovery unit is controlled by a pumping device 10, and the level of sea water in channel 6 of the unit 1 is controlled by regulating the pumping rates of pumping devices 9 and 10 with each other in a manner to cause the sea water level to rise, fall, or remain constant, as desired. At the beginning of the evaporation phase of the process, a quantity of sea water is pumped into the unit to a level less than the maximum attainable level of sea water for channel 6. The maximum attainable level of sea water in channel 6 is determined by the height of partition 8 in the recovery unit, and the levels of the liquids on either side of the partition should never rise above the height of the partition. As shown in FIG. 3, there is no water in channel 7 of the recovery unit at the beginning of the evaporation phase of the cycle. When sea water has reached the less than maximum level, conditions within the unit are adjusted to increase evaporation of water vapor from the surface of the sea water in channel 6. The evaporation rate can be increased by raising the temperature of the sea water and by reducing pressure in the confined space 13 which includes all of channel 7 and the area above channels 6 and 7. In the preferred embodiment of this invention the temperature of sea water is initially raised by a suitable heating means to a point less than the boiling point of sea water. Reduction of pressure on the confined space 13 can be accomplished by means of any known evacuation method, and a preferred method will be described in a discussion of the collection cycle of this process.

Evaporation of water vapor from the surface of the sea water in channel 6 continues at the existing temperature and pressure conditions until an equilibrium is established between the water vapor phase of confined space 13 and the sea water liquid phase in channel 6. At this point the equilibrium which has been established between the liquid and vapor phases within the unit is upset by the application of pressure to the confined system. The pressure of the system can be increased by any suitable and economical means such as by adding a fluid to the system in a manner which upsets the equilibrium established in confined space 13. The fluid may be added in the form of a gas such as a refrigerating gas, an inert gas, or water vapor gas. However, in this invention the fluid is added the form of a liquid, and this liquid may be sea water added to channel 6 or it may be fresh water added in channel 7. The addition of a liquid to the system increases the liquid volume of the system, and decreases the gaseous volume of the system through compression within the confined space. From this compression of the gaseous phase of the system, the water vapor included in confined area 13 is condensed and received for collection in channel 7.

Describing the operation of this invention, sea water is added to channel 6 until the liquid level in the channel rises to the less than maximum level as shown in FIGURE 3. The sea water in this channel is heated in a suitable manner to a temperature less than the boiling point of the sea water solution, and the pressure in space 13 is reduced to less than atmospheric pressure. Space 13 is defined at any one time in this process as the confined space common to both channels 6 and 7 and excluding any liquid contained within either channel. During the evaporation phase of the process, space 13 includes the confined space above the sea water level of channel 6 together with all of the confined space in and above channel 7. Under these conditions of temperature and pressure, water vaporizes from the surface of the sea water in channel 6 until an equilibrium is established between the liquid phase of channel 6 and the gaseous phase of confined space 13. When evaporation is complete, and an equilibrium is established, fresh water is pumped into channel 7 from a reservoir supply. As the fresh water level rises in channel 7, the volume of space 13 is decreased and this compression results in condensation of water from the gaseous phase. Fresh water is added to channel 7 until a maximum level is reached as shown by FIGURE 4. Sensing devices 14 can be located at desirable levels in channels 6 and 7 to sense and control pumping of liquids into and out of the channels. The sensing devices 14 can detect the level of liquids in channels 6 and 7 and upon sensing this level, circuits can be closed or opened to operate the pumping devices which cooperate to cause the levels in the channels rise or fall, as desired. These circuits are not shown as they may be of any conventional design using known detecting and actuating devices.

At the end of the compression phase of the cycle, as shown in FIG. 4, a quantity of water has condensed from space 13 onto all interior surfaces of the unit. With a proper design of the unit and of partition 8, the major portion of the condensed water can be collected in channel 7 of the unit. Also, FIGURES 3-6 show the roof 16 of the unit 1 as being inclined downwardly toward the fresh water side of the unit in order that condensed water on the interior surface of the roof will readily flow toward the fresh water side of the unit where it can be collected.

When condensation is complete, the fresh water with its collected condensate is removed from channel 7 in any suitable manner such as by the pumping device 12. At the same time as the fresh water is being removed from the unit, sea water is added to the channel 6 portion of the unit in order to bring the salt water level up to its maximum permissible level as shown in FIGURES 5 and 6. The sea water level in channel 6 is raised at a rate which will maintain the pressure on space 13 at an approximate constant in order to prevent re-evaporation of water from channel 7 during removal of the collected water from that channel.

FIGURE 6 shows the appearance of the unit at the end of the removal phase of the recovery cycle. All fresh water has been removed from channel 7, and the sea water level in channel 6 is at its maximum high level. In this position, the pressure condition in gas-tight space 13 is at an intermediate point between the maximum pressure point required for compression and the minimum pressure point required for evaporation.

In order to return the unit to its starting position as shown in FIG. 3, the sea water level in channel 6 is lowered to its less than maximum position. By withdrawing sea water from the unit, the pressure on gas-tight space 13 is reduced and conditions for evaporation are re-established. A heat exchange relationship exists between channels 6 and 7, and through the use of any known heat exchange construction, the heat of condensation is transferred to the cooler incoming sea water in channel 6. Additional heat may be added as desired to maintain the process and to increase the rate of evaporation during the evaporation phase of the cycle. This additional heat may be supplied by steam injection means 15, by electrical means 15' or by any means which proves to be economical to the process. The temperature of the sea water can be raised to any point up to and above its boiling point, but it is a purpose of this invention to utilize relatively small temperature differentials together with pressure differentials in order to recover water at a cost considerably less than that required in prior processes where heat energy is applied in the amount required to raise the sea water to its boiling point. The ideal temperature of sea water evaporation in any system utilizing the process and apparatus of the invention will depend upon the size and design of the apparatus, the cost of the particular source of heat energy selected, and the capacity and cost of operation of the pumping devices included in the system. It may be desirable under certain conditions to raise the sea water temperature a relatively small amount and to use relatively great pressure differentials. On the other hand, it may prove to be more economical under other conditions to raise the temperature of the sea water to its approximate boiling point and to use relatively small pressure differentials. It is contemplated that any combination of temperature and pressure changes can be used with the present system, and the apparatus can be designed to produce ideal volume ratios between the liquid channels and the gas-tight vapor space. The design of the apparatus should consider a construction which will result in a maximum surface area of sea water for evaporation purposes and a maximum area of the condensation surfaces for collection of the condensate. Variations from the constructions shown in FIGURES 1-6 will be apparent to anyone skilled in the art.

Figure 7:
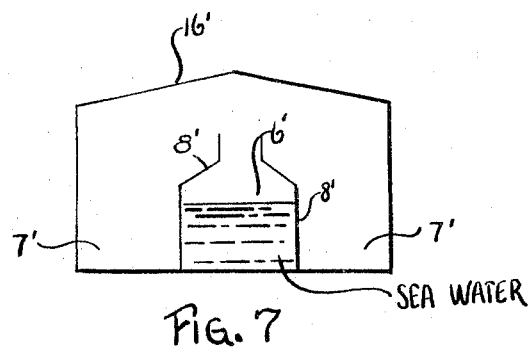
FIGURE 7 is a cross-sectional end view of a modified form of apparatus.

FIGURE 7 is a modification of the system shown in FIGURES 1-6, in that, it includes one sea water channel 6' and two collection channels 7' which are in heat exchange relationship to the sea water channel. The recovery unit may be divided into any number of sea water and fresh water channels by use of partitions 8' to liquid-seal the channels from each other.

Figure 8:
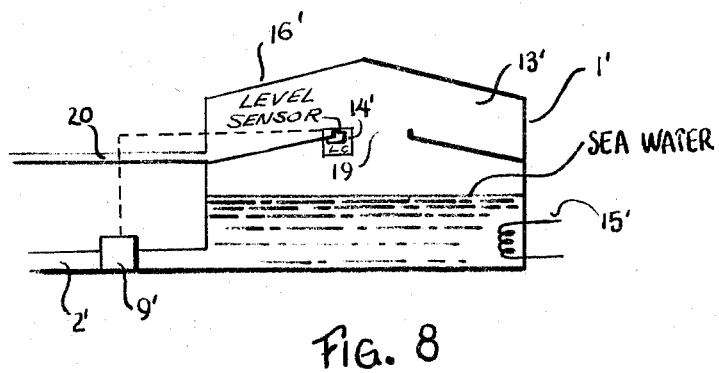
FIGURE 8 is a cross-sectional view of another embodiment of apparatus which is a part of this invention.

FIGURE 8 shows a modified recovery unit which includes a cylindrical housing 1' having a domed roof portion 16'. The lower part of this unit receives sea water from a source 2' by means of a pumping device 9', and this pumping device may serve as both an inlet and an outlet control means for the sea water in order to vary the level of the sea water in the unit. It is also possible to have separate inlet and outlet pumping devices which are coordinated in operation for the purpose of controlling the liquid level in the unit. In this embodiment, pressure is applied to gas-tight space 13' by raising the level of sea water rather than by addition of fresh water to a separate channel as in the embodiments shown in FIGURES 1-7. In the modification of FIGURE 8, evaporation takes place when sea water is at a relatively low level. This evaporation may be made more rapid by addition of heat, such as by electrical heating means 15′, and by the partial evacuation of gas-tight space 13′ in any economical manner. When an equilibrium is established between the liquid and vapor phases the level of the sea water is raised. This compresses the vapor phase and condensation takes place in the upper part of the unit. The dome shaped partition 18 with its opening 19 separates the collected condensate from the sea water, and collection of the fresh water is made by suitable means through outlet 20. It can be seen that as the sea water level rises and approaches the level of the opening 19 that the surface area of the sea water decreases because of the constricting effect of the dome shaped partition 18. This results in a more efficient operation because there is less condensation of water back into the feed solution and the major part of the condensation takes place above the partition 18 where it can be readily collected.

As in the other embodiments of this invention, a heat exchange relationship exists between fresh water side and the sea water side of partition, and suitable heat exchange apparatus can be incorporated into the structure of any of the modifications of this invention for the purpose of efficiently transferring heat of condensation to the feed solution.

Although this invention has been described as applied to the recovery of fresh water from sea water, it may be used to separate other solvents from solutions as will be apparent to those skilled in the art. It is to be understood that many modifications and variations of the present invention are possible, and that it is within the scope of this invention to practice it other than as specifically described.

What is claimed is:

A method of recovering pure water from sea water which comprises the steps of introducing a quantity of sea water into a gas-tight vessel, heating said sea water to cause water to evaporate and form water vapor in the space thereabove, introducing a quantity of pure water into the vessel adjacent said quantity of sea water but separated therefrom, said pure water and said sea water having a common water vapor space thereabove, introducing an additional quantity of pure water to raise the level of said pure water and to compress the water vapor in said space causing the vapor to condense as distillate which is collected in said pure water, thereafter withdrawing the resultant pure water and lowering its level, and simultaneously introducing sea water into the vessel at the same rate as the rate of withdrawal of said distillate to maintain the pressure in the vessel substantially constant and to assist in the withdrawal step, and reducing the level of the sea water to lower the pressure and to encourage evaporation of the sea water.

References Cited by the Examiner
UNITED STATES PATENTS

| | | |
|---|---|---|
| 556,157 | 3/1896 | Minor. |
| 585,365 | 6/1897 | Skiffington _____ 202—185.2 |
| 697,912 | 4/1902 | Chase. |
| 849,579 | 4/1907 | Siebel _____ 202—75 |
| 1,966,938 | 7/1934 | Stone. |
| 2,368,665 | 2/1945 | Kohman et al. |
| 2,490,659 | 12/1949 | Snyder. |
| 2,629,687 | 2/1953 | Silva. |
| 2,716,446 | 8/1955 | Ross. |

NORMAN YUDKOFF, *Primary Examiner.*

W. L. BASCOMB, *Assistant Examiner.*